April 22, 1952 K. T. KING 2,594,034
COLLAPSIBLE MOTOR SCOOTER
Filed March 28, 1949 2 SHEETS—SHEET 1
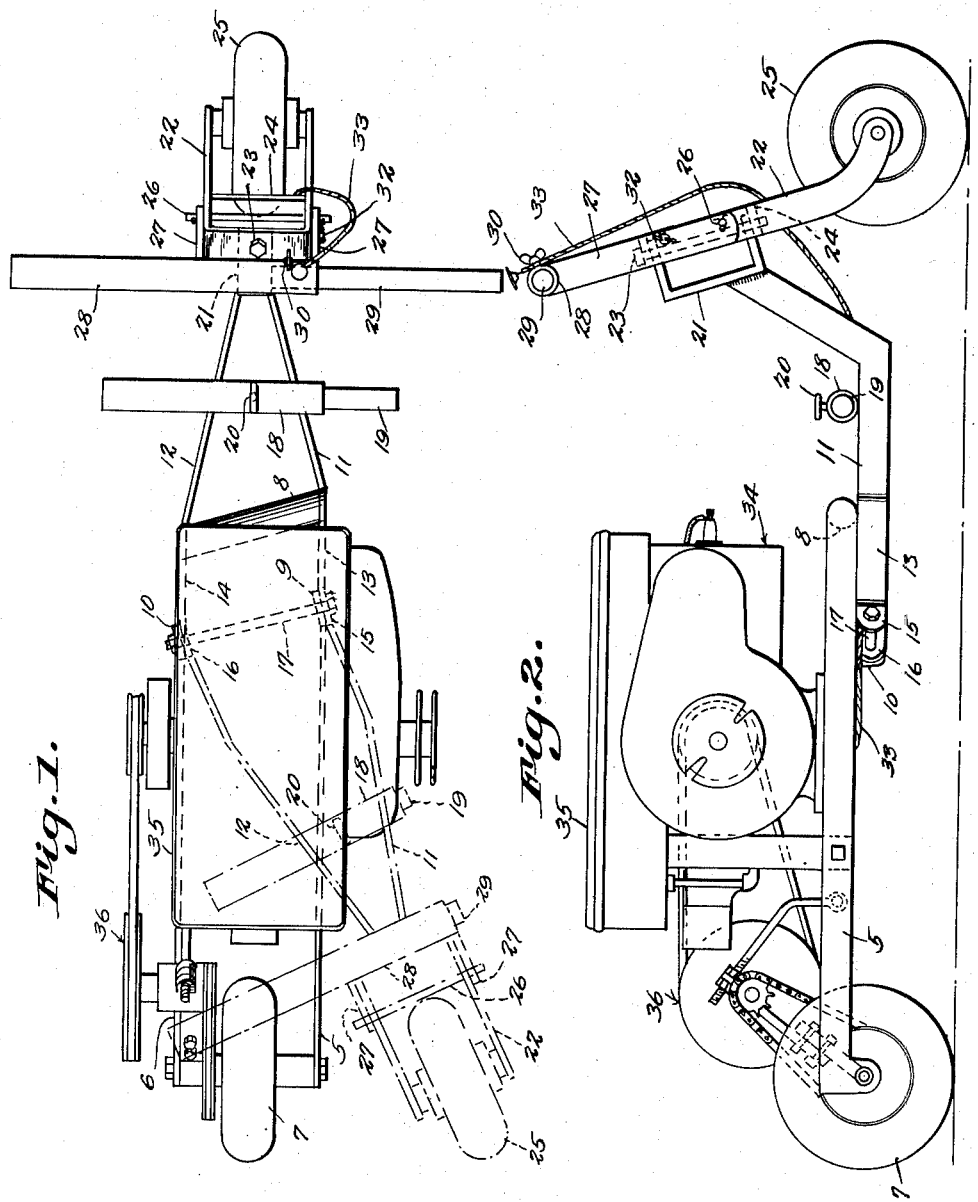
K. T. King
INVENTOR
BY C. A. Snow & Co.
ATTORNEYS.

April 22, 1952     K. T. KING     2,594,034
COLLAPSIBLE MOTOR SCOOTER
Filed March 28, 1949     2 SHEETS—SHEET 2
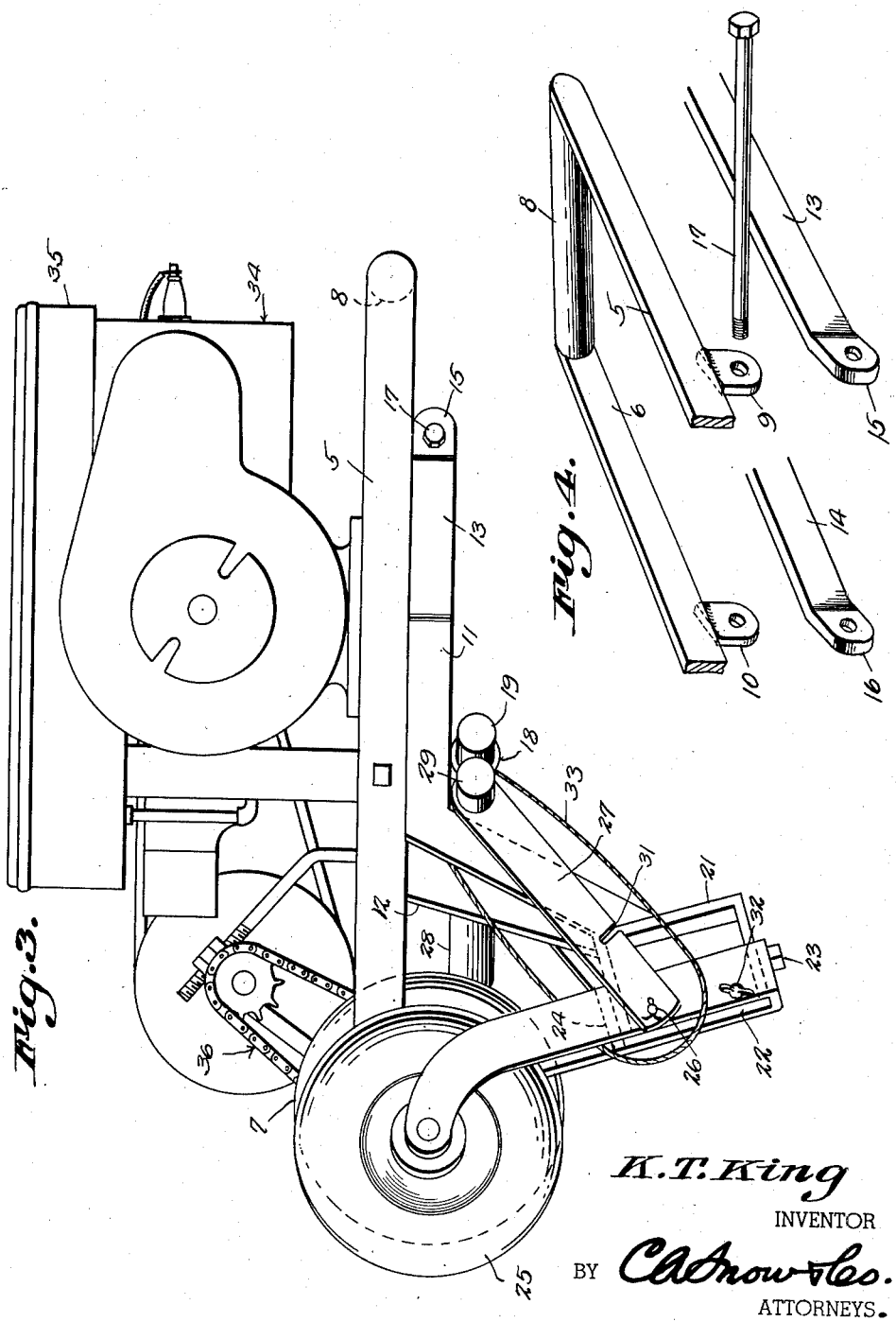
K.T.King
INVENTOR
BY C.A.Snow&Co.
ATTORNEYS.

Patented Apr. 22, 1952

2,594,034

UNITED STATES PATENT OFFICE 2,594,034

COLLAPSIBLE MOTOR SCOOTER

Keith T. King, Colchester, Ill.

Application March 28, 1949, Serial No. 83,885

2 Claims. (Cl. 180—33)

This invention relates to that type of motor-powered passenger-carrying vehicle known commonly as a motor scooter, and more particularly, the invention has reference to a collapsible motor scooter specially adapted for being stored in a small area when not in use.

To my knowledge, there has not previously been devised a collapsible vehicle of this general type, despite the fact that under certain conditions there is a clear desirability for a small motor scooter foldable swiftly and with ease into a compact mass occupying only a small space in airplanes, apartments, during shipment, etc.

To this end, I have devised a motor scooter construction which will meet these desirable aims.

Another important object is to provide a collapsible motor scooter which not only can be folded or collapsed swiftly and with ease so as to occupy only a very small space, but which additionally can be unfolded for use with equal speed and facility.

Still another important object is to provide a motor scooter of the character described which can be constructed at no greater expense, and in fact at less expense, than motor scooters presently in general use, while still embodying the collapsible construction noted above.

Another important object is to provide, in a scooter of the character described, a construction which will be durable and which will not readily get out of order.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Fig. 1 is a top plan view of a motor scooter constructed in accordance with the invention, the dotted line showing the position of the front portion of the scooter when collapsed or folded.

Fig. 2 is a side elevational view of the scooter unfolded.

Fig. 3 is an enlarged side elevational view of the scooter collapsed.

Fig. 4 is a fragmentary exploded perspective view of the connection between the front and rear portions of the scooter frame.

Referring to the drawings in detail, 5 and 6 designate a pair of parallel elongated rear frame members extended longitudinally of the scooter and having rotatably mounted between their rear ends the rear wheel 7.

The rear frame member 5 is longer than the frame member 6, and extending between and connecting the front ends of the frame members is the handle 8 here shown as circular in cross section. Said handle 8 is for pulling or carrying the scooter when it is collapsed, in a manner to be described. By reason of the unequal lengths of the members 5 and 6, the handle 8, as clearly shown in Fig. 1, is oblique to a line drawn longitudinally and centrally through the device.

Fixedly connected by welding or by any other suitable fastening means to the undersides of the members 5 and 6 are the depending apertured lugs 9 and 10 (see Fig. 4) said lugs 9 and 10 being parallel to each other, but oblique to the parallel frame members 5 and 6 to which they are respectively connected. Referring to Fig. 1, one of the lugs is disposed further rearwardly than the other and the reason for this arrangement will become apparent in the description to be provided.

The frame members 5 and 6 comprise components of the rear portion of the scooter, and considering now the front portion thereof, this front portion includes the front frame members 11, 12 converging forwardly as shown in Fig. 1, and extending upwardly at their front ends as shown clearly in Fig. 2. The front frame members 11 and 12 have parallel rear portions 13, 14 respectively, the free ends of which are bent obliquely as at 15 and 16 and apertured for registry with the apertures of the lugs 9 and 10.

As may be noted from the drawings, one of the front frame members, here shown as the member 12, is longer than the other, so that the oblique ends 15 and 16 of said members are in contact with the lugs 9 and 10, and a pivot shaft 17, which can comprise a threaded bolt or its equivalent, is extended through the registering apertures of the lugs 9 and 10 and the oblique ends 15 and 16.

By reason of this construction, it may be observed from Figs. 1 and 3 that the entire front portion of the scooter is capable of pivoting about the pivot shaft 17, and when swung on this pivot, the front portion of the scooter moves out of the plane of the longitudinal center line of the scooter, pivoting in a plane oblique to said center line so that the front portion of the scooter will move to the dotted line position illustrated in Fig. 1 and the full line position illustrated in Fig. 3. In this position, the front portion of the scooter is collapsed against the underside of the rear portion thereof.

In scooters of this type, it is general practice to provide a foot rest, and to this end, I provide the sleeve 18, in which telescopes the extension bar 19, which can be secured in extended or collapsed positions by means of the clamping screw 20 threadable through the sleeve.

The purpose of providing a telescoping foot rest, wherein only half the foot rest, shown as the lower half in Fig. 1, is retracted, is to eliminate projections extending beyond one side, shown as the underside in Fig. 1, when the scooter is collapsed. It is not necessary to collapse the other end of the foot rest, because this portion will be disposed under the rear portion of the scooter.

Welded to the upwardly extended front ends of the front frame members 11 and 12 is the clevis 21, supporting the steering yoke 22 of inverted U-shaped formation. Steering yoke 22 is pivotally connected to the clevis 21 by means of the pivot bolt 23 extending downwardly through the top portion of the yoke and through the arms of the clevis, and having its lower end extended through the plate 24 extending between the arms of the yoke intermediate the ends thereof.

Rotatably mounted between the depending yoke arms is the front wheel 25.

Extending transversely and horizontally between the arms of the yoke 22 is a pivot shaft 26, pivotally connecting to the yoke the upwardly extended arms 27 that comprise an upper extension for the yoke. The arms 27 have fixedly secured to their upper ends the laterally extended sleeve 28, in which telescopes the extension member 29, these providing a steering handle for the motor scooter. As in the case of the foot rest, the handle collapses only at one side of the scooter, because the other side is disposed under the rear portion of the scooter when said scooter is collapsed, as shown by the dotted lines in Fig. 1.

For the purpose of fixedly securing the member 29 in extended or retracted positions, I provide the clamping screw 30.

During normal use of the scooter, the arms 27 will be fixedly associated with the yoke 22, and to this end, I provide the slot 31 in said arms, receiving clamping means 32 here shown as a stud and wing nut so that the extension arms 27 are locked in longitudinal alignment with the steering yoke 22 for normal operation of the scooter.

Connected at one end to the steering handle, and extending downwardly between the arms of the steering yoke and under the front portion of the scooter is the flexible control cable 33, that extends over the pivot shaft 17 as clearly shown in Fig. 2, the other end of said cable extending to the motor or power plant, which is designated generally by the reference numeral 34. It will be understood in this connection, that the motor design may vary, but in any event, it is contemplated that the motor will be mounted upon the rear frame members 5 and 6. Supported on top of the motor housing is the gas tank 35, which also comprises in the present instance a seat for the operator. Said seat, of course, would be suitably cushioned and designed as desired.

Generally designated by the reference numeral 36 is the transmission, extending from the power plant to the rear or drive wheel 7, and again, the present invention is not particularly concerned with the design of said transmission. In any event, said transmission and motor are both located upon the rear portion of the scooter, in a position in which they will be out of the way of the front portion when said front portion is collapsed against the underside of the rear portion.

I believe that the collapsible arrangement need not be dwelt on extensively, and will be apparent from the drawings and from the description which has so far been provided. However, to sum up the collapsible construction, it may be noted that assuming the scooter is to be collapsed from the position illustrated in full lines in Figs. 1 and 2, the user unloosens the locking means 32, so that the upper extension 27 of the steering yoke is collapsed downwardly and rearwardly against the front frame members 11 and 12. The position of said upper extenison in its collapsed position is clearly shown in Fig. 3.

Then, grasping the handle 8, the operator exerts upward pull on said handle, so that the entire front portion of the scooter swings downwardly and under the rear portion to the dotted line position illustrated in Fig. 1 and the full line position illustrated in Fig. 3. In the unfolded positions of the parts (Fig. 2), the rear frame members 5 and 6 serve as stops for the front frame members 11 and 12, or more properly, for the parallel portions 13 and 14 of said front members. In the collapsed positions, member 5 is a stop for member 12, which crosses it obliquely, as seen from Fig. 1. Additionally, it may be noted that in this position, the front portion will have its wheel disposed at the side of the rear wheel, and while part of the front portion will be disposed under the rear portion, the remainder will be disposed to the side of said rear portion, thus to collapse the entire structure in the minimum of space. The steering handle and the foot rest, meanwhile, are also telescoped, so that they will not provide any projections beyond the side of the scooter.

The scooter is now fully collapsed, and can be transported readily in airplanes, automobiles, or stored in a small space for shipment or where the user has minimum space for the storage of the scooter, as in an apartment.

During the collapsing operation, the operating cable of course flexes as necessary.

I believe it will be apparent that any suitable releasable latches can be provided adjacent to the various pivotal connections described, and it is thought that said latches can so readily be applied to the device by those skilled in the art, as not to necessitate special illustration and description herein.

What is claimed is:

1. In a self propelled vehicle an elongated front frame section carrying adjacent one end a dirigible ground wheel and means to govern the movements of said ground wheel, an elongated rear frame section carrying adjacent one end a traction wheel said rear frame section also carrying a prime mover and means to establish driving connection between the prime mover and the traction wheel, a horizontally disposed pivot shaft carried by the rear frame section intermediate the ends thereof, said pivot shaft extending transversely of the rear frame section below said frame section and being pivotally connected to the front frame section adjacent the end thereof remote from the ground wheel, and said pivot shaft lying at an acute angle to a perpendicular to the longitudinal axis of the vehicle whereby when the vehicle is folded the front frame section will lie at an angle to the rear frame section.

2. The structure recited in claim 1 in which the means to govern the movements of the ground wheel includes a telescopic handle bar.

KEITH T. KING.

REFERENCES CITED

The following references are of record in the file of this patent:

UNITED STATES PATENTS

| Number | Name | Date |
|---|---|---|
| 864,202 | Simmons | Aug. 27, 1907 |
| 1,229,359 | Weddle | June 12, 1917 |
| 1,524,552 | Hudry | Jan. 27, 1925 |
| 2,077,751 | Floss | Apr. 20, 1937 |
| 2,111,691 | Salsbury | Mar. 22, 1938 |
| 2,479,467 | Bryant | Aug. 16, 1949 |

FOREIGN PATENTS

| Number | Country | Date |
|---|---|---|
| 18,823 | Great Britain | A. D. 1903 |
| 883,836 | France | Apr. 5, 1943 |